United States Patent
Shaburov et al.

(10) Patent No.: US 8,689,174 B2
(45) Date of Patent: Apr. 1, 2014

(54) EXTENSIBILITY OF PATTERN COMPONENTS

(75) Inventors: Victor Shaburov, Leimen (RU); Ulf Fildebrandt, Oftersheim (DE); Markus Cherdron, Muehlhausen (DE); Vinay Nath Penmatsa, Bangalore (IN); Rachel Ebner, Ra'anana (IL); Frank Seeger, Wiesloch (DE); Peter Giese, Kaiserslautern (DE)

(73) Assignee: SAP AG, Walldorf (DE)

( * ) Notice: Subject to any disclaimer, the term of this patent is extended or adjusted under 35 U.S.C. 154(b) by 1186 days.

(21) Appl. No.: 11/648,392

(22) Filed: Dec. 28, 2006

(65) Prior Publication Data

US 2008/0163162 A1 Jul. 3, 2008

(51) Int. Cl.
*G06F 9/44* (2006.01)

(52) U.S. Cl.
USPC .......................................... 717/105; 717/113

(58) Field of Classification Search
None
See application file for complete search history.

(56) References Cited

U.S. PATENT DOCUMENTS

| | | | | |
|---|---|---|---|---|
| 5,680,619 | A * | 10/1997 | Gudmundson et al. | 717/108 |
| 6,083,276 | A * | 7/2000 | Davidson et al. | 717/107 |
| 6,799,320 | B1 * | 9/2004 | Elvanoglu et al. | 719/331 |
| 7,140,000 | B2 * | 11/2006 | Yucel | 717/104 |
| 7,278,130 | B2 * | 10/2007 | Iborra et al. | 717/101 |
| 7,509,629 | B2 * | 3/2009 | Sakamoto et al. | 717/105 |
| 7,533,365 | B1 * | 5/2009 | Hogstrom et al. | 717/105 |
| 7,555,742 | B2 * | 6/2009 | Iborra et al. | 717/101 |
| 2001/0010034 | A1 * | 7/2001 | Burton | 703/17 |
| 2002/0023261 | A1 * | 2/2002 | Goodwin et al. | 717/146 |
| 2002/0104068 | A1 * | 8/2002 | Barrett et al. | 717/104 |
| 2002/0199025 | A1 * | 12/2002 | Kutay et al. | 709/250 |
| 2003/0069871 | A1 * | 4/2003 | Yucel | 706/60 |
| 2004/0148586 | A1 * | 7/2004 | Gilboa | 717/108 |
| 2004/0181418 | A1 * | 9/2004 | Petersen et al. | 705/1 |
| 2004/0216085 | A1 * | 10/2004 | Wilson et al. | 717/108 |
| 2005/0261884 | A1 * | 11/2005 | Sakamoto et al. | 703/13 |
| 2006/0004845 | A1 * | 1/2006 | Kristiansen et al. | 707/103 R |
| 2008/0127049 | A1 * | 5/2008 | Elaasar | 717/104 |
| 2008/0134135 | A1 * | 6/2008 | Elaasar | 717/104 |

OTHER PUBLICATIONS

Guennec, Sunye and Jezequel "Precise Modeling of Design Patterns", 2000, Ini Proceedings of UML'00.*
Kim, France and Ghosh "A UML-based language for specifying domain-specific patterns", 2004, Journal of Visual Languages and Computing, Special Issue on Domain Modeling with Visual Languages, v 15, i 3-4, pp. 265-289.*

(Continued)

*Primary Examiner* — Jason Mitchell
(74) *Attorney, Agent, or Firm* — Mintz Levin Cohn Ferris Glovsky and Popeo, P.C.

(57) ABSTRACT

Methods and apparatus, including computer program products, related to extensibility of pattern components in a visual modeling language environment. A pattern component may implement an interface, the pattern component may be received (e.g., by a compiler), and a determination may be made as to whether components of the interface are implemented by the pattern component. If so, a reference to the interface is bound to the pattern component (e.g., a function call referencing a function signature of an interface may be substituted with a call to a function having the same name of the pattern component). A role may be assigned to a pattern component of a visual modeling environment of an application development system and a behavior may be performed based on the role assigned to the pattern component.

16 Claims, 10 Drawing Sheets

(56) References Cited

OTHER PUBLICATIONS

Mak, Choy and Lun "Precise Modeling of Design Patterns in UML", 2004, Proceedings of the 26th International Conference on Software Engineering, pp. 252-261.* q. Sheng, B. Benatallah "ContextUML: a UML-based modeling language for model-driven development of context-aware web services", 2005, The 4th International Conference on Mobile Business, pp. 206-212.*

* cited by examiner

FIG. 1

EXTENSIBILITY OF PATTERN COMPONENTS

BACKGROUND

The present disclosure relates to data processing by digital computer in a visual modeling language environment, and more particularly to extensibility of pattern components in a visual modeling language environment.

Application programs, sometimes referred to simply as applications, are programs that an end-user runs to accomplish certain tasks. Applications typically work in conjunction with one or more back-end systems, which store the data to be worked on (e.g., business objects and other business data), as well as logic for manipulating the data (e.g., transactions or other business logic). Examples of back-end systems include database systems, enterprise resource planning (ERP) systems, and customer relationship management (CRM) systems. A user interface (UI) is designed to work in concert with application programs, and facilitates interaction between humans and computers by inviting and responding to user input.

A structured approach to developing applications includes a model-driven tool such as VISUAL COMPOSER, which is a visual modeling program manufactured by SAP AG of Walldorf (Baden), Germany (SAP). A tool like the VISUAL COMPOSER allows a developer to compose applications in a flexible way by using patterns. A pattern graphically depicts functional components (e.g., entities of a modeling language) as drag-and-drop services, and a data flow definition between them. A pattern (sometimes referred to as a UI pattern) is a configurable, reusable unit designed to let users accomplish a specific but generically-defined task, such as searching for business objects, and editing the objects that are retrieved. Generally, each pattern has a specific semantic meaning and defined interaction behavior. In some implementations, a pattern can include a predefined arrangement of UI elements. Using patterns promotes uniform design throughout an application or group of applications because similar tasks are represented and handled in the same manner. For example, a user can always search in the same way, whether searching for a sales order, a business partner, or a product. User interface patterns can be defined at various levels, and can be nested within each other, thus creating hierarchies of patterns. At the top level of the hierarchy, a pattern can act as a "floor plan" for a user interface that is designed to help end-users complete a specific business process.

A visual modeling language environment can have a separation between a designtime and a runtime version of an application. A designtime version of an application can include a combination of patterns and configuration of properties of those patterns that can define an application being developed. Underlying a designtime version of an application can be a model of the application, which can be an implementation-independent model (e.g., a model in accordance with a Universal Modeling Language (UML) specification) or a more implementation-specific model (e.g., a model in accordance with a programming language, such as the JAVA programming language from SUN MICROSYSTEMS, INC. of Santa Clara, Calif.). A runtime version of an application can be generated by a visual modeling program based on a designtime version of the application, with the use of a model underlying the designtime version of the application. For example, a designtime version of an application can be used to devise a model with JAVA classes and, the JAVA classes can be compiled to generate a JAVA runtime version of an application.

SUMMARY

The subject matter disclosed herein provides methods and apparatus, including computer program products, that implement techniques related to extensibility of pattern components in a visual modeling language environment.

In one aspect, input is received that characterizes a definition of pattern roles of a pattern component and a selection of a child component (e.g., a child in the sense of a hierarchy of a model of an application being developed in a visual modeling language environment having parent components being higher than child components; e.g., a component containing one or more sub-components may be parent component and the sub-components may be referred to as child components), a determination is made as to which role is associated with an interface implemented by the child component (if any), and the role associated with the interface is associated with the child component. Each potential role may be associated with one or more interfaces and the pattern component may define a pattern of a component of an application in a visual modeling environment of an application development system. The role that is associated with the child component, if any, may be one of the potential roles.

In another aspect, a role is assigned to a pattern component of a visual modeling environment of an application development system and a behavior is performed based on the role assigned to the pattern component.

In another aspect, input is received that characterizes a definition of a pattern component and an interface implemented by the pattern component, a determination is made as to whether components of the interface are implemented by the pattern component, and, if so, a reference to the interface is bound to the pattern component (e.g., a function call referencing a function signature of an interface may be substituted with a call to a function having the same name of the pattern component). The pattern component may be a pattern of a component for application development in a visual modeling environment.

The subject matter may be implemented as, for example, computer program products (e.g., as source code or compiled code), computer-implemented methods, and systems.

Variations may include one or more of the following features.

A pattern component may graphically depict an entity of a visual modeling language. A pattern component may be a configurable, reusable unit corresponding to a task, where the pattern component has a specific semantic meaning and defined interaction behavior.

Architecture of a modeling environment of a visual modeling program may include a first layer defining a technical platform, a second layer defining a framework for implementing a modeling language in the technical platform, a third layer defining designtime interfaces for modeling language entities, and a fourth layer defining a layer for configuring the modeling language entities. Pattern components may be implemented in the third layer and roles may be assigned in the fourth layer.

A behavior may be associated with a child component, where the behavior is associated with a role assigned to the child component. Associating the behavior may include generating a runtime version of the child component including the associated behavior.

A behavior may be associated with a pattern component, where the behavior is associated with a role of the child component.

A pattern component may have one or more roles. A pattern component may implement one or more interfaces.

A second potential role may be determined to not be associated with a child component. Behaviors associated with the second potential role may be omitted from a runtime version of the child component.

Assigning a role may include assigning a role associated with an interface to the child component if a cardinality associated with the role allows the child component to be a child of the pattern component; otherwise, prohibiting the child component from being a child of the pattern component in a runtime version of an application.

Based on a cardinality of potential roles for child components of a pattern component, pattern components maybe prohibited from being child components of the pattern component.

Input may be received that characterizes a selection of a second child component implementing at least interface. A second role associated with a second interface implemented by the second child component may be determined. The second role may be one of the potential roles (e.g., potential roles of a pattern component that is a parent to the second child component). The second role associated with the second interface may be assigned to the second child component.

Input may be received that characterizes a definition of second potential roles for child components of a second pattern component, where each potential role is associated with second one or more interfaces, and a selection of a second child component implementing interfaces of a child component of a pattern component (e.g., a pattern component not being the second pattern component). A second role associated with one of the interfaces implemented by the second child component may be determined, where the second role is one of the second potential roles. The second role associated with the interfaces may be assigned to the second child component, where the second role is distinct from the role of the child component based on the potential roles of the pattern component being different from the second potential roles of the second pattern component.

Assigning a role may include determining the role associated with an interface implemented by a pattern component. Assigning a role may include determining the role associated with the interface based on an association in a context of the component.

Binding may include generating a runtime version of a pattern component in lieu of the reference to the interface.

A role may be assigned to a pattern component based on a type of interface implemented by the pattern component.

The subject matter described herein can be implemented to realize one or more of the following advantages. Extensions to patterns may be provided that allow for dynamic (or late) binding, including interfaces, roles, or both. Interfaces may allow for pattern components to be bound at runtime based on an interface implemented by a pattern component. Advantageously, interface-based code may allow for new pattern components that implement interfaces to be introduced into a system and changes to the interface-based code need not occur. Roles may allow for a pattern component to have different behaviors based on a role of the pattern or a role of another pattern. Roles may be assigned based on a context of a pattern component (e.g., based on information in a parent component of a model of an application and interfaces implemented by a pattern), such that different behaviors are automatically adopted. For example, two instances of a same component may be created and used in a different way, depending on their context.

Details of one or more implementations are set forth in the accompanying drawings and in the description below. Further features, aspects, and advantages will become apparent from the description, the drawings, and the claims.

BRIEF DESCRIPTION OF THE DRAWINGS

FIG. 1 is a screenshot of a user interface.

Like reference numbers and designations in the various drawings indicate like elements.

DETAILED DESCRIPTION

Figure 1:
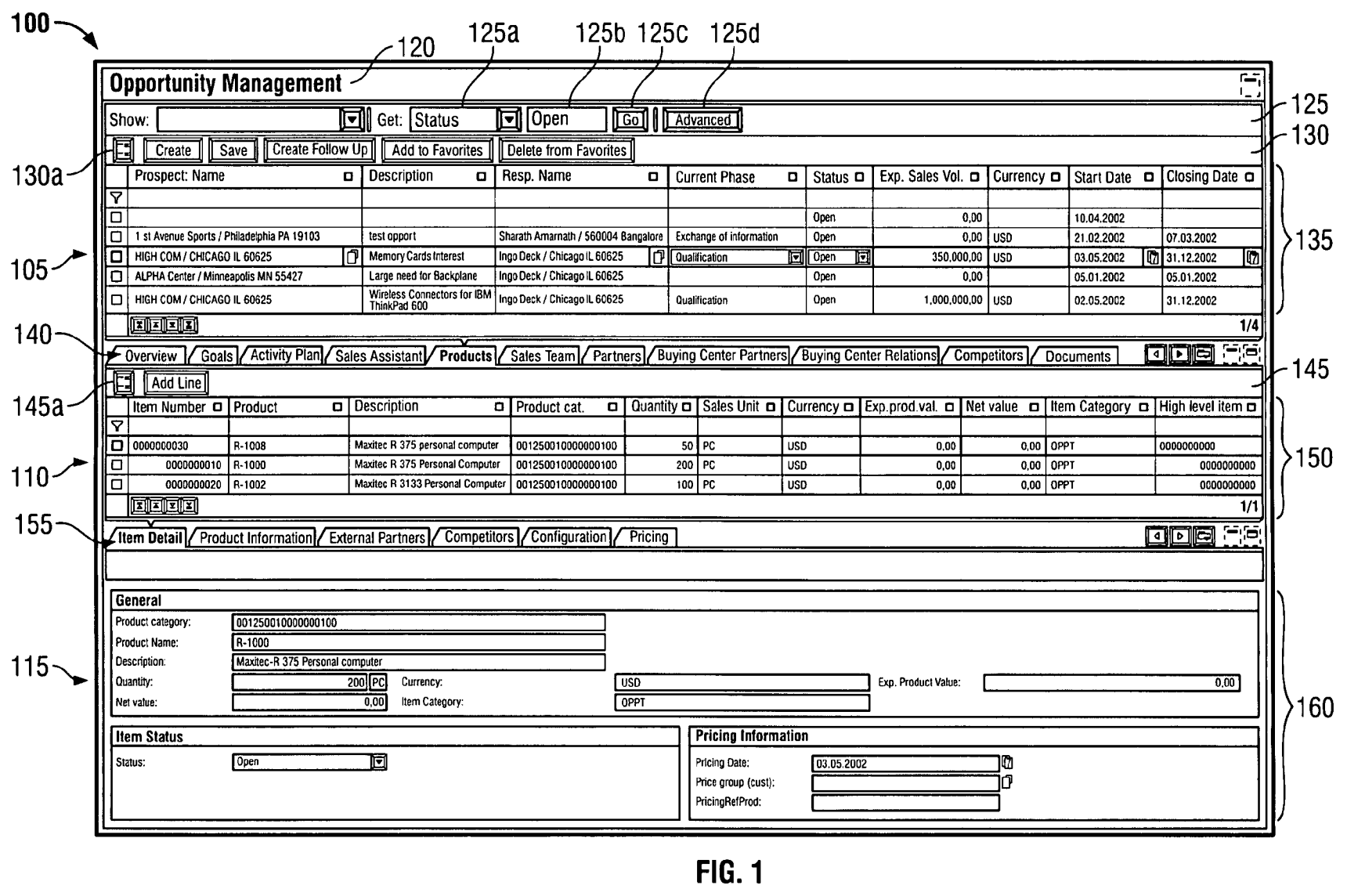
Figure 2:
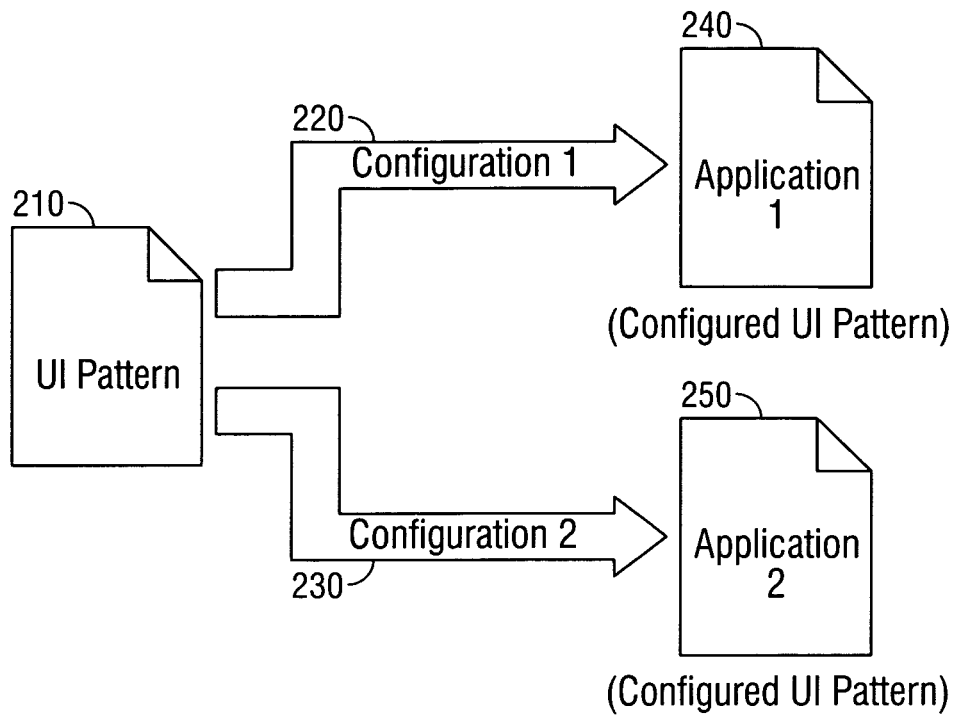
FIG. 2 is a block diagram illustrating the configuration of a UI pattern.

FIG. 1 illustrates a screenshot of a user interface 100. User interfaces typically contain various UI elements, including controls (e.g., drop down element 125a, text box element 125b, or button element 125c) and data elements (e.g., content area 135), arranged into application screens or views. The design of a user interface, including the layout of the UI elements and the navigation between the UI elements and between the views, is usually left up to the application developer. Thus, if the task of developing the same application is given to a number of application developers, each developer may design a different user interface for that application. Although each version of the application implements the same functionality, the user interfaces may be significantly different from each other.

As an example use of patterns, a floor plan for a user interface can specify that an application screen is to be divided into three sections, with a top section for searching for and selecting business objects, a middle section for showing the details of an object selected in the top section, and a bottom section for showing the details of a sub-object of the object in the middle section. More detailed, lower-level patterns can be used for each of the sections specified in a floor plan. For example, that a section of the screen is to include a search bar with various text entry fields and buttons at the top, and an area below the search bar where content (i.e., the content returned as a result of a search) is to be displayed. This process can continue with the definition and hierarchical nesting of even lower-level patterns.

The user interface 100 shown in FIG. 1 illustrates an example of a pattern-based user interface. The user interface 100 has a floor plan that includes an object identification pattern (OIP) 105 and two object data patterns (ODPs) 110 and 115. Object identification pattern 105 and object data patterns 110 and 115 are made up of embedded lower-level patterns, such as a data view, a form pane, a list pane, or a chart pane. Each embedded pattern can include further embedded patterns, including, for example, tool bars, tables, tab strips, and other UI pattern elements. Object identification pattern 105 is a pattern that provides an interface for searching for objects (using zero or more selected criteria), and for displaying objects found to meet those criteria. Like the floor plan pattern, OIP 105 is itself a pattern with several embedded elements. Object identification pattern 105 includes a title bar 120, a search bar 125, a tool bar 130, and a content area 135.

User interface 100 of FIG. 1 illustrates a particular application that is based on the patterns described above. Such an application can be referred to as a pattern-based application, a pattern application, or simply an application. As explained above, UI patterns are reusable user interface units designed for generic tasks—for example, an OIP pattern is designed for the task of searching for and selecting business objects stored in a back-end system (e.g., a database). In order to create a concrete user interface, e.g., user interface 100 with OIP 105, UI patterns need to be configured. FIG. 2 illustrates an example in which a UI pattern 210 is configured (shown using arrows 220 and 230) to create two UI applications 240 and 250. Configuration one 220 is used to create application one 240, and configuration two 230 is used to create application two 250.

Configuration is the process through which a UI pattern is developed into an actual user interface (or portion thereof) for an actual application. For illustrative purposes, this might be compared to instantiating an object of a specified class—the UI pattern (comparable to a class) specifies the general properties of a portion of a user interface, and a configured pattern (comparable to an instantiated object) specifies the actual properties of the portion of the user interface for an actual application. UI pattern 210 represents the general properties of the UI portion—for example, that a table is included in that UI portion, and that the location of the table is under a title bar. Configuration one 220 represents the process of specifying properties of the UI portion (for example, the specific columns that will be included in the table when the table is rendered), so as to create an application (for example, application one 240) that displays a UI with a table under the title bar with specific columns defined by configuration one 220. Similarly, application two 250 displays a table, but with specific columns as defined by configuration two 230.

A configuration can also specify what back-end systems and data are to be used for a pattern. For example, configuration one 220 can specify a particular back-end system (e.g., a local or remote database system) and a particular service to use to access the data on that back-end system that is to be displayed in the table in the UI pattern 210. Examples of services that can be used to access a host system include web services, ENTERPRISE JAVA BEANS (EJBs), Business Application Programming Interfaces (BAPIs) developed by SAP, and other business logic services.

As another example of a configuration, an OIP might specify that a user interface is to include a search bar at the top of the interface and a content area below the search bar. The search bar is to include a drop down box for selecting a search field, a text box for entering a query string, and a "Go" button for executing searches. Configuring such a pattern is the process of providing specifics for the pattern for an actual application. For example, to configure the OIP pattern, an application developer can specify the search fields to be included in the drop down box, the query to run when the "Go" button is pressed, the back-end system in which to run the query (i.e., the system where the actual data is located), and the columns from the returned results to display in the content area.

In some implementations, a UI pattern can have a number of predefined layouts (e.g., a grid layout and a flow layout), and the application developer can decide which of the available layouts to use as part of the configuration process. Moreover, each layout can be further configurable, providing the application developer with further configuration options (e.g., an option to create groupings of fields or other elements). In yet other implementations, a pattern can be defined to have a fully configurable layout, giving the application developer complete freedom to modify the arrangement of the elements in the pattern (e.g., by using a graphical configuration tool to specify screen positions for each element in the pattern).

Thus, the degree to which each UI pattern is configurable can vary. For example, the degree to which the arrangement of elements in a pattern can be configured can vary across a spectrum—for some patterns, the arrangement of UI elements can be fully predefined, leaving no configuration options for the application developer; for some patterns, the application developer can be given an option to choose between a handful of predefined arrangements; and for other patterns, the application developer can be given full freedom to define a custom arrangement of elements.

Other pattern properties can also be partially or fully configurable. For example, a developer can be given no options or a few options regarding the actions to be performed by a UI element in a pattern. Or the developer can be allowed to define and associate a custom action with an element in a pattern.

As can be seen from the prior discussion, the term "configuration" can be used in multiple ways. First, "configuration" is the process by which a pattern is developed into a concrete user interface (or portion thereof) for a concrete application. A "configuration" also refers to the data that is produced as a result of the configuration process—i.e., it is the set of data that defines a concrete user interface based on a pattern. Finally, "configuration" can also be used to refer to the set of options provided during the configuration process. As used in this manner, a selected option in a configuration produces a defined item of configuration data.

The use of patterns to develop applications creates two potential levels of re-use. First of all, patterns serve as reusable building blocks for building user interfaces. For example, an OIP can be used to create two different user interfaces—a first configuration can define a user interface for searching for business objects related to customers (customer objects), and a second configuration can define a second user interface for searching for business objects related to inventory (inventory objects).

In addition, configurations can be reused, meaning that the configurations themselves can serve as re-usable building blocks for building applications. Thus, in the example above, the OIP configuration that defines a user interface for searching for customer objects can be integrated and used in two different applications (e.g., a customer relationship management application and a billing application).

The configuration of a UI pattern can be done through the use of a configuration application, such as a visual modeling program. A configuration application facilitates the process of configuring a UI pattern. In one implementation, the configuration application displays multiple configuration options for the application developer to select. The configuration options can include lists of the available back-end systems, queries, query fields, and query results.

Selections of configuration options can be stored as configuration data for a UI pattern. The configuration data can include associations between one or more of the UI elements in the UI pattern and one or more of the back-end entities to be used with the UI pattern. As an example, configuration data for the OIP described above can include a specification of the back-end system to be used, the query to be run in the back-end system, the query fields to show in the drop down box, and the result fields to display in the content area.

Configuration data can also include customization data for one or more of the UI elements in a UI pattern. Customization data can specify local changes to the business objects associated with the UI elements. For example, a drop-down menu item might be associated with a back-end query field called "UID". The customization data may specify that the "UID" field should be displayed using a more user-friendly label, for example, "reference number". Such a customization applies only to the particular UI element in the particular application being configured, and does not affect how the business object is represented in the back-end system or how the business object is represented by other UI elements in other applications that use the same UI pattern.

The configuration data can be stored in a configuration repository. In one implementation, the configuration data is stored in one or more files. Such files can be nested to reflect a hierarchical arrangement of further UI patterns. The configuration data can then be read by a pattern component, which generates the implementation of the actual user interface for the application based on the configuration data.

Figure 3:
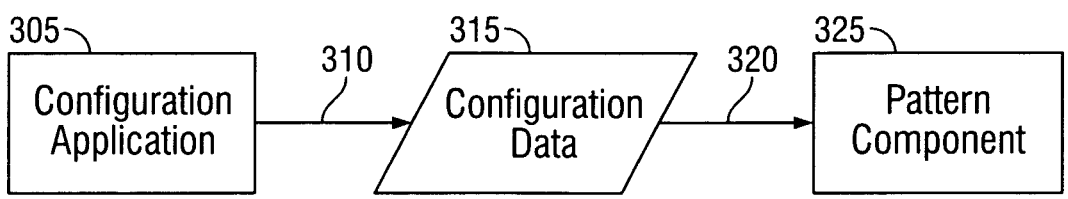
FIG. 3 is a block diagram illustrating the use of a configuration application.

FIG. 3. illustrates the use of a configuration application 305 to create 310 configuration data 315, which is combined 320 with a UI pattern component 325 to produce a pattern-based application. The configuration application 305 generates configuration data 315 that is specific to pattern component 325. That is, the configuration application 305 can ensure that a configuration schema for pattern component 325 is followed.

The generation of a pattern-based application based on a configuration can be done either immediately after the configuration has been completed, or at a subsequent point in time, such as when the pattern-based application is executed.

Figure 4:
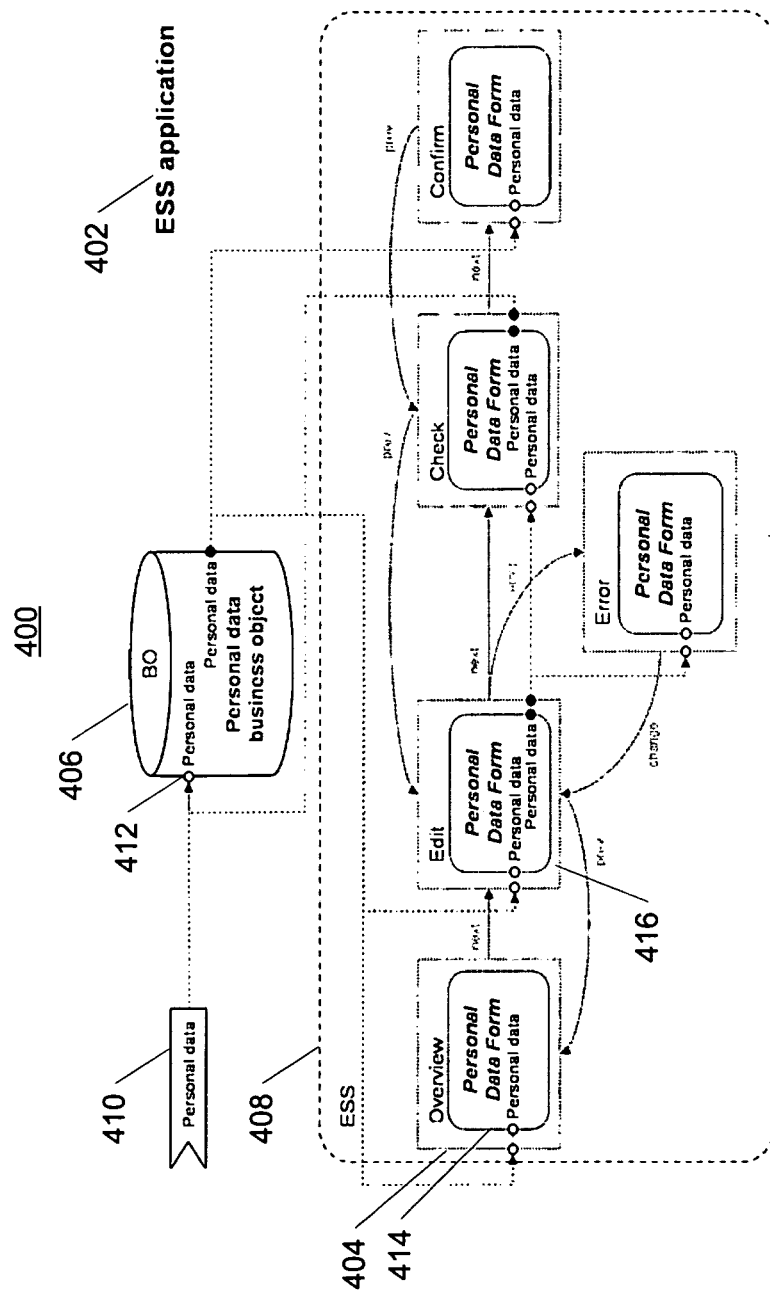
FIG. 4 is an illustration of an application being developed is a visual modeling program.

FIG. 4 is an illustration 400 of an application being developed is a visual modeling program. The illustration 400 is a graphical representation of an ESS (Employee Self-Services) application 402 in a visual modeling program. The visual modeling program allows users to generate applications based on a combination of patterns (graphical representations of entities for an application being developed). The visual modeling program includes a set of patterns that are provided to a user and define entities of a composition language. The composition language defines how applications can be developed in the visual modeling program. Thus, the base set of patterns can be considered building blocks for developing an application in the visual modeling program.

In the composition language, there are different types of entities that have different semantics and syntax, as represented by different patterns and types of patterns in a visual modeling program. The illustration 400 includes several different types of patterns, including patterns for scenarios, services, states, ports, plugs, and interactors (i.e., different patterns for different types of entities, including scenarios, services, etc.). Scenarios, such as the Overview scenario 404, are entities that represent a reusable user interface unit of an application being developed (e.g., a tab in a user interface of a web application). Services, such as the BO service 406, are entities that need not have a visual representation in an end-user application (e.g., in an application developed in the visual modeling program) and provide data to other components of an end-user application (e.g., a service that, in response to receiving a selection of personal data as search criteria, outputs personal data matching the search criteria). States, such as the ESS state 408, define visual states of a scenario by defining elements that are visible to an end-user of an application being developed (e.g., by encapsulating scenarios to be displayed). Ports, such as the Personal data port 410, can be connection points to and from entities in the modeling language (e.g., a connection point between a service and an interactor). Plugs, such as the Personal data plug 412, can be external representations of ports of a component (e.g., if the BO service 406 were drilled down, the Personal data plug 412 can be a port). Interactors, such as the Personal Data Form interactor 414, can be an atomic unit of user interaction (in the visual modeling program, such that the visual representation can not be drilled down to another level of entities), where an interactor can obtain and provide data by transforming input data into output data based on user interaction (e.g., the interaction of an end-user of an application being developed) (e.g., an interactor can be a form).

In the composition language, as reflected in a visual modeling program, the different types of entities have a different type of corresponding graphical representation. For example, interactors can have a graphical representation of a box defined by solid lines and rounded corners. As another example, a service can have a corresponding graphical representation of a cylinder.

The composition language can be defined to include certain entities that have associated semantics and syntax. For example, the composition language can be defined to include the Overview scenario 404 and the Edit scenario 416, each of which can have different semantics and different syntax, as defined by the composition language. The entities defined by the composition language can be referred to as base entities. These entities can be understood by the visual modeling program such that the visual modeling program can generate an associated runtime version of the entities. For example, by having a special generator that interprets Edit scenarios, a special generator can generate a runtime version of the Edit scenario 416.

Although certain types of entities are discussed with reference to FIG. 4, additional, different, or fewer entities can be used in a visual modeling program to represent different semantics and syntax of components of an application being developed.

Figure 5:
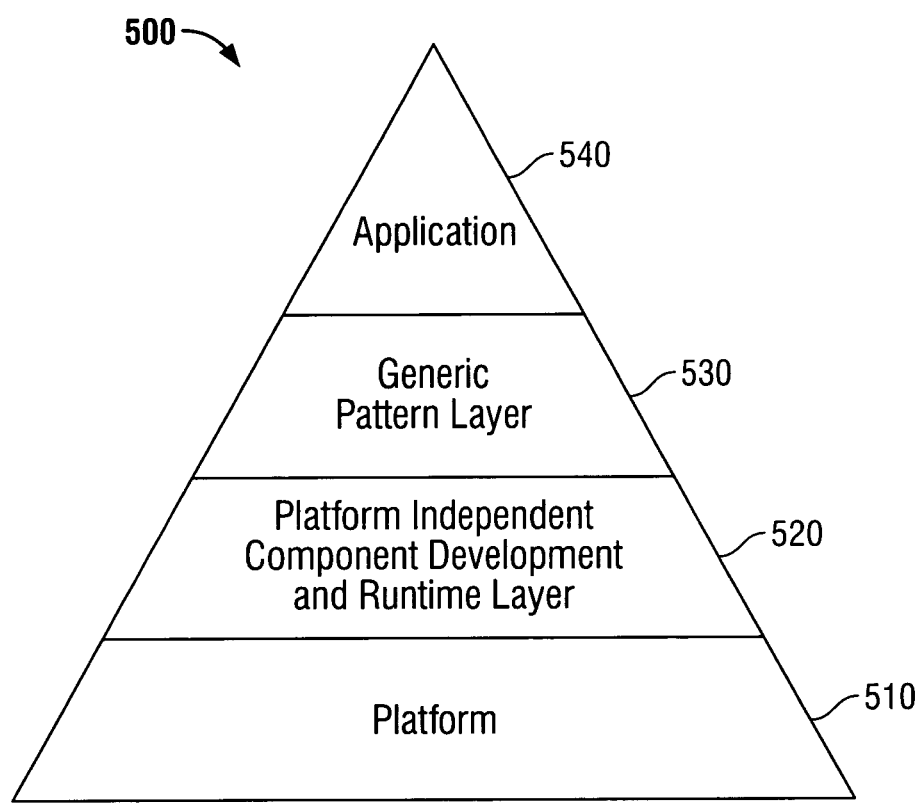
FIG. 5 is a block diagram of a framework for simplifying application development.

FIG. 5. illustrates an example framework 500 for application development based on the configuration of patterns. At the base, framework 500 includes a platform layer 510 on which applications execute. Two example platform layers 510 are the JAVA 2 PLATFORM, ENTERPRISE EDITION (J2EE), manufactured by SUN MICROSYSTEMS and the ADVANCED BUSINESS APPLICATION PROGRAMMING (ABAP)-based platform manufactured by SAP. The platform layer is generally chosen (or already established) by the enterprise that executes the applications and can be referred to as the technical platform layer.

To enable applications to execute on different platform layers 510, framework 500 includes a platform independent component development and runtime layer 520. In this environment, applications can be developed using modules known as components. Components can be stored in a component repository and reused—that is, each component can have more than one instance, where the component instances are used in multiple applications, or multiple times in the same application. Components can be embedded (nested) within other components, and they can have zero or more visual representations. In one implementation, each component provides three separate interfaces—a programming interface, a data binding interface, and a visual interface. The programming interface can be used by an embedding entity (a component embedder—e.g., a higher level component, or an application) to interact with the embedded component. The visual interface can be used by a component embedder to access and use the visual representations of the embedded component (for example, to form the component embedder's own visual representation). The data binding interface can be used by the component embedder to exchange data with the embedded component.

The combination of components in the platform independent component development layer 520 can be referred to as a framework layer as it can provide a framework for interfacing between patterns in the pattern layer 530 and the technical platform in the platform layer 510. By defining this interface, the platform independent component development layer 520 can be used to define an implementation of a modeling language for a technical platform (e.g., a translation of entities of a model to runtime entities; whereas the pattern layer 530 provides designtime interfaces (e.g., patterns) for the modeling language entities).

In one implementation, platform independent layer 520 provides a framework for defining application components in a declarative and/or graphical manner, without needing to program the components for a particular platform layer 510. Platform independent layer 520 also provides interfaces, tools, services, and other features to enable the application components to execute on a specific platform layer 510. In another implementation, platform independent layer 520 additionally provides functionality to enable application components to render user interfaces on a number of different clients, with platform independent layer 520 performing the appropriate transformations for specific clients.

Building on top of platform independent layer 520, framework 500 includes a pattern layer 530 with one or more generic UI patterns. Each UI pattern is generic because it defines a particular pattern (e.g., a floor plan pattern, an OIP, an ODP, a GDP, and the like), but not the specific content that is included for a specific application that uses that pattern. The specific content for a specific application is created by configuring the pattern.

The top layer, application layer 540, contains the actual applications to be run by end-users. In this framework, an end-user application is made up of one or more configured UI patterns. In an implementation where each UI pattern includes a pattern component, an end-user application is made up of one or more configured pattern components (e.g., pattern components and their corresponding configurations). An end-user application can be stored in a configuration repository in the form of configuration data and references to the associated pattern components.

Framework 500 thus enables application developers to develop applications by configuring generic pattern components into components for specific applications (e.g., components that display the actual fields illustrated in UI 100). In one implementation, as described in more detail below, configuration data (e.g., data in a configuration repository or in one or more configuration files) is used to configure a generic pattern component into a component for a specific application. The configuration data can be defined through the use of declarative and/or graphical tools that are included, for example, in a configuration application, thus dramatically simplifying the task of developing applications. If, for example, the configuration application has access to a meta data repository that specifies the fields available for a particular back-end system for which an application is being developed, the application developer can develop an application (e.g., create a configuration) by simply choosing the fields in the meta data repository to be included (e.g., displayed) in the application.

Framework 500 can be thought of as creating a role-based programming methodology, where layers 510, 520, 530, and 540 correspond to different roles for different developers. Framework 500 is illustrated as a triangle to represent graphically that complexity and difficulty decrease for each role as one moves from the base layer to the top layer. Thus, a developer who is responsible for building and maintaining the platform independent layer 520 has the most complex and difficult job, and must be familiar with the programming languages, tools, and other intricacies of one or more platform layers 510. A developer who is responsible for building and maintaining UI patterns (e.g., configuration applications and pattern components) has a simpler job, as he or she can take advantage of the features and functionality offered by the platform independent layer 520, as described above. Finally an application developer (a developer who is responsible for developing end-user applications) has the least complex job, as he or she can create applications simply by configuring predefined UI patterns. Where the configuration process is as simple as using a configuration application to choose the desired fields from a set of available fields, the application developer need not have advanced programming skills.

Figure 6:
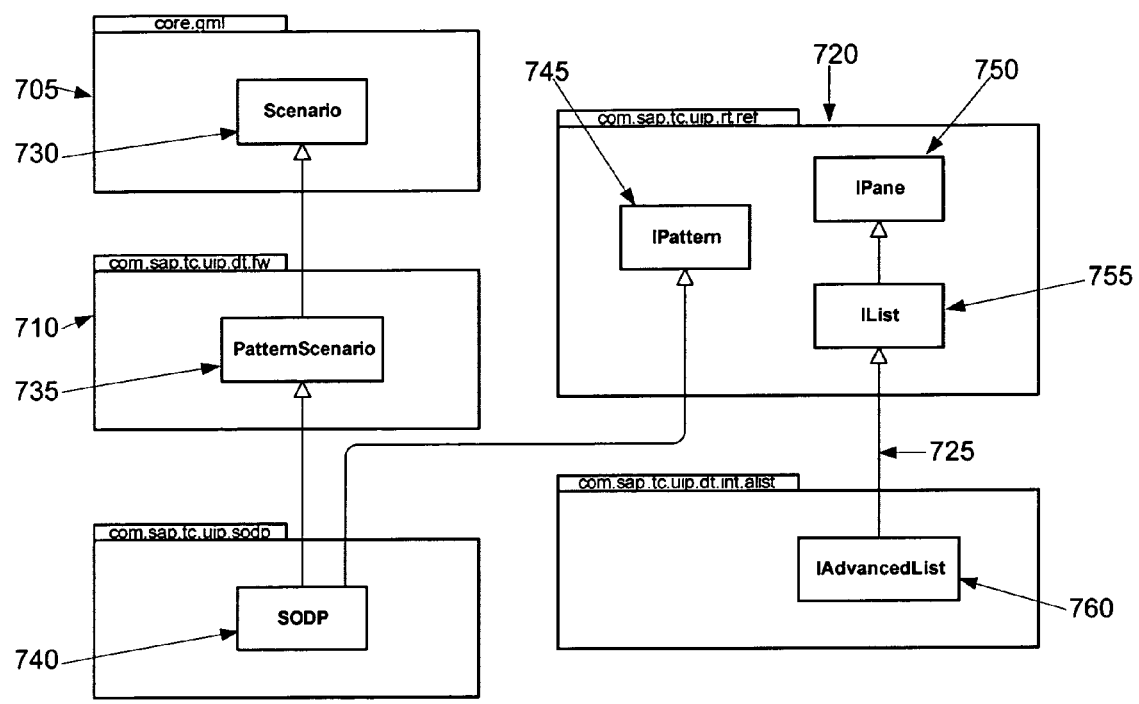
FIG. 6 is a diagram of relationships among components of a visual modeling language.

FIG. 6 is a diagram of relationships among components of a visual modeling language. A point of view for the components might be that of a pattern component developer (e.g., someone that develops patterns or pattern kits, rather than a developer of an application based on patterns). The components include foundational objects of a visual modeling language, interfaces for pattern components, and an additional pattern component. The foundational objects include objects that may form a basis for starting development in accordance with the modeling language. The foundational objects may include core objects, such as a "scenario" object definition 730 that defines a scenario (e.g., a basic object from which a business scenario may be defined), and designtime framework objects 710 (e.g., components of a designtime environment that may be used to build patterns), such as a scenario pattern framework object 735.

The interfaces for pattern components include basic interfaces 720 and an advanced list interface 760. The basic interfaces 720 are used as a basis from which further interfaces may be developed (e.g., a basic set of interfaces deployed with a visual modeling environment). The basic interfaces may include a pattern interface 745 ("IPattern"), pane interface 750 ("IPane"), and list interface 755 ("IList"). The advanced list interface 760 may be based on the list interface 755, as indicated by the inheritance arrow 725.

In general, interfaces for a pattern component may provide a description of computer methods that may be required to be implemented (e.g., in source code) by a pattern that implements the interface. For example, interfaces for pattern components may be similar to JAVA interfaces, except that interfaces for pattern components may be limited to methods and might not include use of variables.

As an example, the list interface 755 may include a method "retrieveListItems," which is specified to return a list of items of an instance of a designtime component. A pattern that implements the interface, such as a pattern named "pullDownMenu," which has a pull-down menu of choices, may be required to implement a method named "retrieveListItems" and return a list of items as a consequence of implementing the list interface 755. If an instance of the pullDownMenu pattern is generated, that pattern may be referred to by an instance of the list interface and methods of the interface may be called based on the reference to the interface name. For example, for an instance of the "IList" interface named List, List may be used to refer to the interface and an instance of the pullDownMenu may be referred to by the List instance (e.g., if a method uses interfaces rather than objects that implement interfaces to refer to instances of components). Also, the method retrieveListItems may be called from the List instance to call the method implemented by the pullDownMenu pattern (e.g., List->retrieveListItems may be used to call a retrieveListItems method implemented for the pullDownMenu pattern).

Advantageously, interfaces may provide a mechanism for polymorphism in a visual modeling language, such that late-binding may be offered for pattern development, which may assist application development. For example, an interface, and a first pattern that uses the interface to refer to patterns that implement the interface may be developed. The first pattern may refer to the patterns without having to refer to a specific type of pattern, such that new patterns that implement the interface may be developed and the first pattern need not be changed to adapt to the new patterns.

Interfaces may be implemented by patterns that are inherited by other patterns. For example, the SODP pattern component 740, which may refer to a pattern component for "Service Oriented Design Patterns" (e.g., patterns that implement services), may be a pattern that is inherited by patterns that represent a service. The SODP pattern component 740 may implement the pattern interface 745, such that all methods of the pattern interface 745 are implemented by the SODP pattern component 740. Service patterns that inherit the SODP pattern component 740 may inherit methods that are implemented for the pattern interface 745. As an example, if a service "search service" inherits the SODP pattern component 740, the search service pattern may inherit methods referred to by the pattern interface 745 and implemented by the SODP pattern component 740.

Although interfaces may be referenced in a user-environment of pattern development, the late-binding of patterns that are referenced as interfaces may occur in response to an end-user application developer causing a designtime version of an application to be compiled to a runtime version of the application. Thus, application developers may have different configurations of visual modeling environments that include different patterns, and the different patterns may be referenced by interfaces (and methods of patterns may be referenced by methods of interfaces).

To implement interfaces in a JAVASCRIPT-based modeling language, prototypes may be used. For example, one or more interfaces may be defined as prototypes and a pattern, defined as a class, may have one or more interfaces attached to the class.

Figure 7:
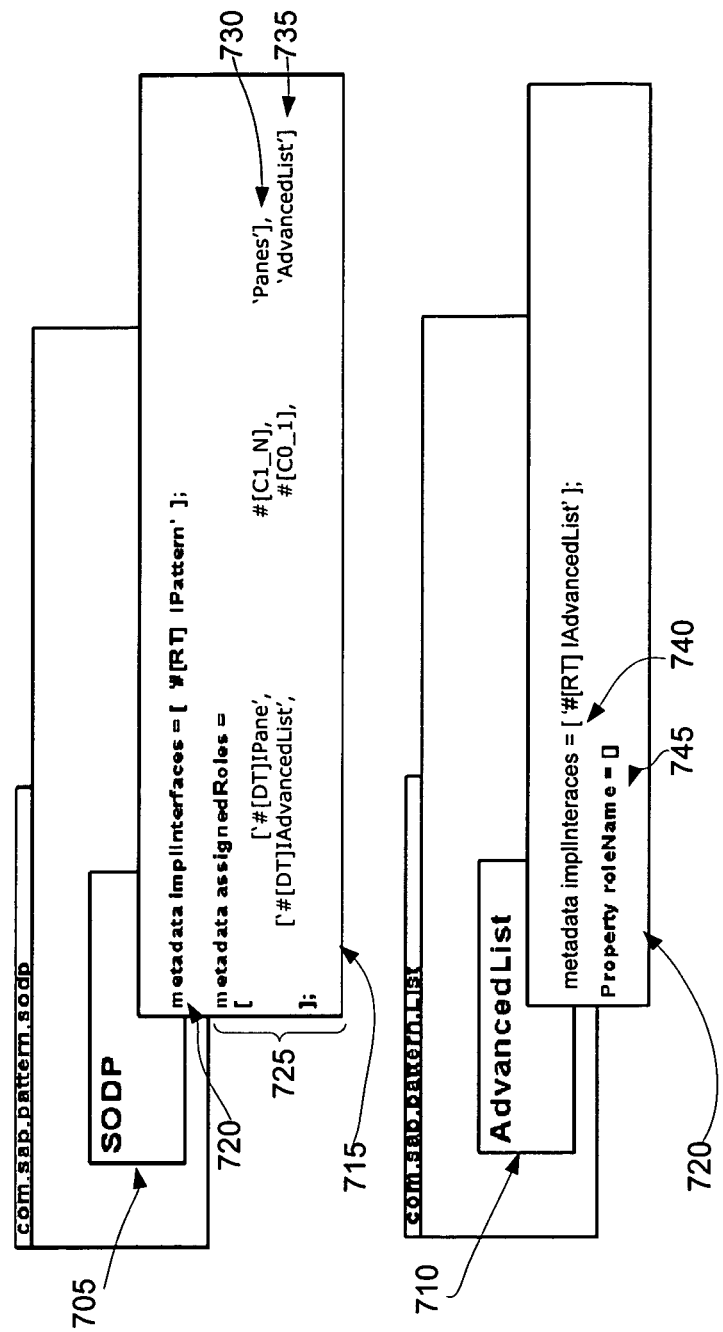
FIG. 7 is a diagram of pattern components.

FIG. 7 is a diagram of pattern components. In general, the diagram may illustrate how interfaces and roles may be implemented in a definition of a pattern component. Interfaces of FIG. 7 may be the same as interfaces described with reference to FIG. 6, where an interface may represent a polymorphic construct for a visual modeling language. Roles may be a construct of a visual modeling language that allows a same pattern component to have different semantic behavior depending on a role assigned to a pattern component. For example, a pattern component may be defined with potential assigned roles and, based on an assignment of one of the potential assigned roles, the semantic behavior of a pattern component may differ.

The pattern components of FIG. 7 include an SODP pattern component 705 and an AdvancedList pattern component 710, which have respective definitions 715, 720. The SODP pattern component 705 implements an interface named IPattern as shown by the first line of the definition 715 of the SODP pattern component. In addition, the SODP pattern component 705 has two assigned roles 725, including a role 730 named Panes and a role 735 named AdvancedList.

Each of the assigned roles 725 includes cardinality information that characterizes a cardinality of child components of the pattern that may implement an interface. For example, the Panes role 730 includes information that characterizes that one or more child components may use the interface IPane, as indicated by line including "IPane', #[C1_N]," where, C1_N characterizes a cardinality of 1 to n. The cardinality information may act as a limit for an amount of components that may be a child of the pattern component. For example, the AdvancedList role 735 is indicated as having a cardinality of 0 or 1 for the interface IAdvancedList. Thus, a number of components (e.g., patterns) that are children of an instance of the SODP pattern 705 may be limited to 1, such that two components that implement the interface IAdvancedList might not be children of the instance.

A role may be assigned to a child component based on the assigned role of a parent pattern component. For example, if an instance of the AdvancedList pattern component 710 were a child of an instance of the SODP pattern component 705, the instance of the AdvancedList pattern component 710 may be assigned the AdvancedList role 735 (e.g., by setting the roleName property 745 to include "AdvancedList"). This assignment may be based on the association of the AdvancedList role 735, in the assigned roles 725 of the SODP pattern component 705, with the IAdvancedList interface, which is implemented by the AdvancedList pattern 710 (as shown by the association 740 of the AdvancedList pattern 710 with the AdvancedList role).

Based on the assignment of a role, semantic behavior may differ. For example, functionality of the AdvancedList pattern component 710 may differ based on whether an instance of the AdvancedList pattern component 710 is assigned the AdvancedList role or another role. Roles may be assigned in ways that differ from an assignment based on assigned roles of a parent object. For example, the assigned roles 725 of the SODP pattern 705 may be defined by default (e.g., in source code of the pattern component as a default assignment of roles). As another example, a series of dialogue boxes (e.g., a wizard) may be presented to a user developing an application using pattern components, and, the user may be able to select roles to assign to a component through the dialogue boxes. As another example, a palette of a visual modeling tool from which a user may choose a pattern may have different roles of a pattern component visually separated (e.g., a pattern having two potential roles may have a first representation for the first role and a second representation for the second role; e.g., the palette may group patterns of a same assigned role together).

To implement semantic behavior associated with a role, methods of a role may have functionality that depends on a role assigned to an instance of a pattern component. The differing functionality may be implemented by determining an assigned role of a pattern component, and performing operations (or not performing operations), based on one or more assigned roles of an instance. For example, the SODP pattern component 705 may be include a method described with the pseudo-code:

```
Class SODP
    override method getConfigurationItemType (element)
    var role = element.getProperty('roleName');
    if (roleName=='Panes') {
        return '#NS[CustomConfigItem]';
        break;
    }
    return '';
end
```

According to that pseudo-code, the method getConfigurationItemType may have a particular behavior if the role Panes is assigned to an instance of the SODP pattern component. In particular, the code "return '#NS[CustomConfigItem]'" may be executed, whereas, it might not otherwise be executed.

Roles may be advantageous as, rather than having code that depends on specific pattern components, the code may depend on a role of a pattern component and new pattern components may adopt those roles, such that the code that depends on an assigned role need not change. For example, the following pseudo-code defines that if a pattern component that calls an event listener is a pattern referred to as an SODP, OSP or PatternAttachment pattern, the pattern cannot be detached (e.g., certain functionality is prohibited):

```
$ENV.defineListener({type:'canDetachElement', func:function(evt) {
    if (evt.object.isa('SODP') || evt.object.isa('OSP') ||
evt.object.isa('PatternAttachment')) {
        WRITE("Can't detach this element from state");
        return false;}
        return true;}});
```

In that code, if a pattern component is introduced that should also not be detached, the above code must be changed. However, if roles are used, the code may be adopted for roles such that the code need not change if new components are introduced that have a same role and a standard way to determine a role exists. For example, the following pseudo-code may perform similar functionality:

```
Class SODP inherit #[BASE]:PatternScenario;
implement #[API]:IPattern
metadata assignedRoles = [
    ['in', '0__N', '#[BASE]:IPatternInport'],
    ['Tabs', '0__N', '#[API]:IPane, #[API]:IPlugin'],
    ['out', '0__N', '#[BASE]:IPatternOutport'],
    ['Service', '0__N', '#[API]:IService']
];
override method canDetachElement(object, state)
if (object.getProperty('roleName') == 'Tabs') {
WRITE("Can't detach this element from state");
return false;
}
return true;
```

In that example, in the method canDetachEment of an SODP pattern component, the role 'Tabs' determines whether a child pattern component is to be prohibited from being detached. If pattern components having the role 'Tabs' are introduced into the visual modeling environment (e.g., if a child component implements the interface IPlugin), the same operations may be performed and the code need not be changed (e.g., a role of the new pattern may also be determined from a method object.getProperty('roleName')). To ensure a compliant format for determining a role, the interface to which a child component implements may include a standard function, such as getproperty( ) that returns a name of a role for a property 'roleName.'

A development framework that implements support for interfaces, roles, or both, may be structured to support plug-ins, also referred to as kits. A kit may be a reusable module that includes information for pattern components, such as designtime information for display and use of an item, and information for generating a runtime version of a pattern component.

In such a framework, all pattern components may be implemented as kits, including all designtime visual information. This information may include, as an example, a configuration of a drilled-down version of a pattern component. For example, when a designtime pattern component is opened (e.g., a scenario pattern component is drilled down), the visual component may configure the associated design-time environment. Advantageously, this may simplify work for kit development and maintenance, because where and how to make changes to reach a desired effect may be intuitively clear for a developer (e.g., in a kit associated with a pattern component).

In addition to having kits that are specific for a pattern component, separate kits may exist for initialization logic and context-specific contstraints. For example, default diagrams of a pattern component may be displayed, if no pattern-specific diagrams exist. As another example, context-specific constraints may be set for pattern component that is drilled-down (e.g., a restriction prohibiting dragging and dropping a component to a component drilled-down may be set). Advantageously, kits for default initialization logic and context-specific constraints may be reused for different patter components. Similarly, as pattern kits need not have initialization logic or logic for context-specific constraints, same kits may be used across various floor plans that have different initialization logic.

In addition, a pattern base kit may be introduced between core classes and concrete kits. This layer may contain implementations of major superclasses and implementation of support for roles and interfaces. This layer may allow kits to remain less dependent on changes in a core and simply kits, as it may contain implementations of many generic functions that may be used by kits.

Figure 8:
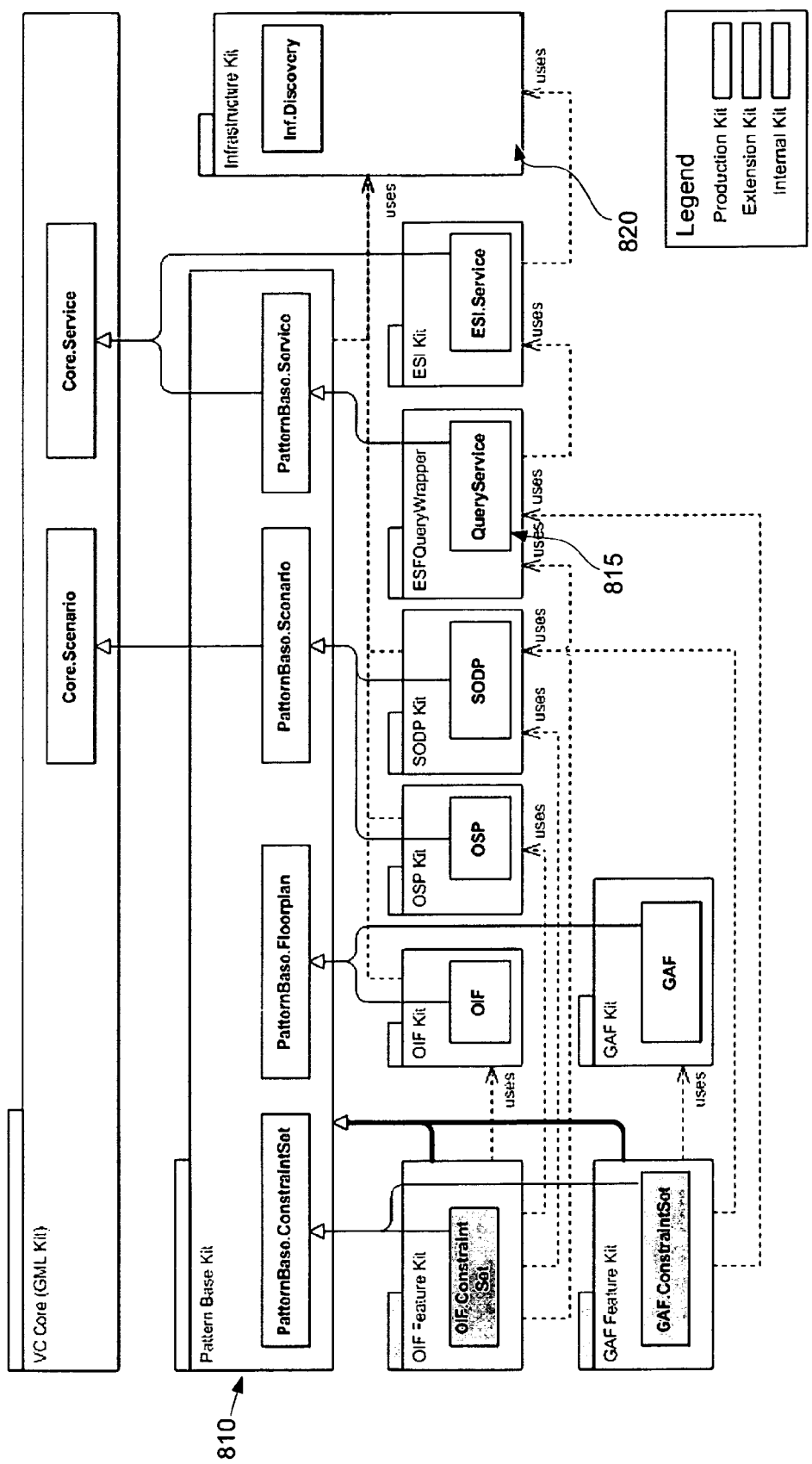
FIG. 8 is a diagram of a structure of kits.

FIG. 8 is a diagram of a structure of kits. The structure of kits may be used to have an extensible visual modeling environment that supports interfaces, roles, or both. In the diagram, arrows represent dependencies between kits.

In that diagram, there exist various types of kits. These types are used for different purposes, including a production kit, internal kits, and extension kits. For example, there is a production kit, referred to as the pattern base kit 810, which may provide generic functions that can be used by various pattern components. It may be considered a production kit as it may be included for all visual modeling environments and may be relied upon to develop patterns. The internal kits include pattern components, services (e.g., the query service 815), and the like. Other kits may include extension kits, which may be used to support additional features (e.g., a set of functionalities), such as constraints.

Aspects of the structure of kits may include patterns being separated from features (e.g., new features). For example, pattern kits are separate from extension kits that include features, such that a selection or de-selection of features is not longer related to a kit implementing specific pattern internal functionality, but rather each extension kit represents a set of features and constraints as a whole, which can either be enabled or disabled. Other aspects may include an infrastructure kit 820 dedicated to providing services to kits that are not directly related to services of pattern components.

Figure 9:
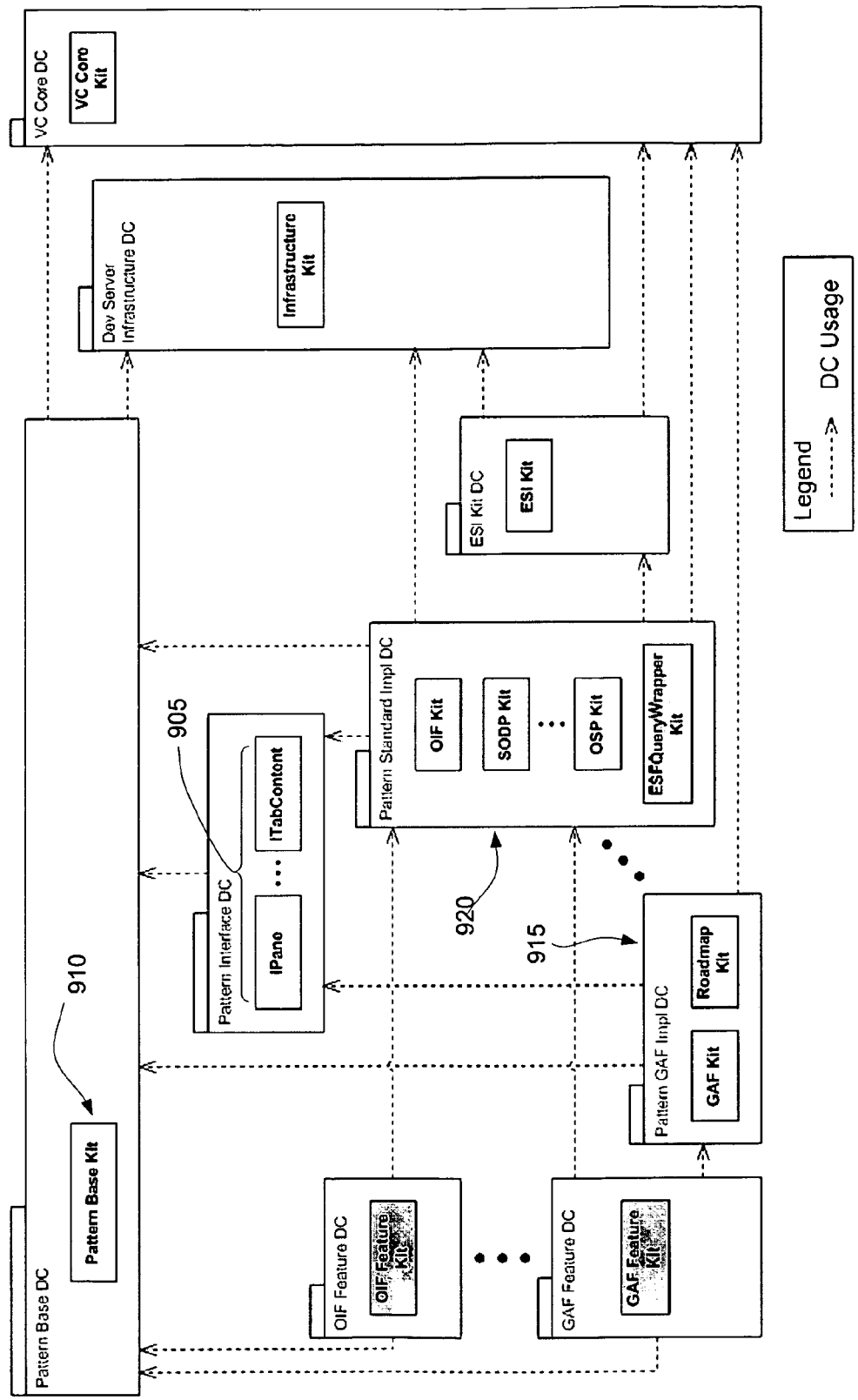
FIG. 9 is a diagram of a development component structure including a pattern interface development component between a pattern base kit and pattern kits.

To implement interfaces an interface kit may be used that is depended upon by pattern kits. For example, all pattern kits may be required to implement an interface, and, interfaces may be provided through an interface kit. FIG. 9 is a diagram of a development component structure including a pattern interface development component (including interfaces 905) between a pattern base kit 910 and pattern kits 915, 920. The pattern interface kit 905 may be an internal kit that contains interfaces that correspond directly to runtime interfaces, and design time interfaces that are required for designtime purposes. Runtime interfaces that are defined by other runtime components may be separated into another internal kit that is its own development component. The kit structuring allows pattern kit developers to separate initialization logic and context-specific constraints logic into feature kits (or its internal kits). Thus, main logic of kits may remain reusable in other floor plans, as there may be no dependency on external constrains introduced by floor plan where it is used and no dependency on internally used kits.

To implement additional features, through feature kits, the following separation of logic may be used. A feature kit may be used to define a set of kits required to allow modeling a specific feature. For feature kits, the above-described distinction between types of kits may be used, including extension kits, internal kits, and production kits. In that distinction, the extension kits may be used to add features, such as a new floor plan (e.g., by adding a new extension kit).

A production kit may represent a model type in a model creation dialog in visual modeling tool. For example, only one model type may exist for modeling of a composed pattern. Consequently, only one production kit may exist (e.g., the pattern base kit). Once a model type is selected in the model creation dialog, a list of features (e.g., extension kits of the selected production kit) may be displayed for selection. A user (e.g., a developer of an application using pattern components) may specify a list of features they plan to use, without directly referencing internal kits.

Constraints may belong to extension kits, such as feature kits, and they may also be placed in separate internal kits. For example, constraints may be placed in separate internal kits if they are planned on being reused for different model types (e.g. different pattern components). An extension kit of constraints may be defined for each floor plan.

To deploy features individually, extension kits may be defined in separate development components, which might not contain internal kits. The extension kits may be similar to an envelope around kits that contain logic, but no patterns. An internal kit may be used many times by different extension kits.

Dependencies between kits may be declared and conventions may be required to prevent implicit dependencies (such as reacting to an event of a kit to which no dependency has been modeled). A feature kit might not contain any class of its own. It might simply work as an umbrella that bundles many internal kits together to one (e.g. as a floor plan).

Initialization logic may be executed when an instance of a component (e.g., a pattern) is generated. As patterns are interrelated, it might not be acceptable to simply put initialization logic in a class of a modeling language that defines a component. For example, in some instance, initialization may differ in different use cases (e.g. in different floor-plans). By bundling a feature kit with initialization, features necessary for initialization may be available. Initialization may be separated by having a standard method call overridden in initialization logic and having that logic registered as an event handler. For example, a method may have a standard name of create, and, that method may be registered with a system registry as an initialization handler for a floor plan object. Thus, the method may be called when a new floor plan is to be initialized and the initialization logic that may be imported through a feature kit may be separated from the component that is to be initialized.

To define constraints on how elements may be connected, e.g., how a search service pattern may be connected to search form but not to other components, constraints based on roles may be defined in every element. This may be implemented as a constraint handler. For example, the following pseudo-code may show how a constraint handler is implemented to restrict connecting of items by roles:

```
Class SearchRoleConstraintHandler
inherit com.sap.tc.UIP.dt.base:RoleConstraintHandler
constructor( )
this.roleLinkDefinition = [
{srcRole:"SearchFrm", trgRole:"Service"},
{srcRole:"Service", trgRole:"OUT1"}];
end
override method isAllowed(role, unit)
if(role=="SearchFrm") return false;
this.supercall(role, unit);
end
```

Similar to initialization logic, constraints handlers may be defined in kits that are separate from components, such as patterns. To allow constraint handler logic to be handled, constraint handlers may be registered with a system and the registry may be used to determine a proper constraint handler to call. A standard name for constraint handlers may be used such that an appropriate constraint handler may be referenced easily (e.g., all constraint handlers may have a method name registerRoleConstraintHandler that takes an argument 'class name' corresponding to a component to have constraint logic).

Figure 10:
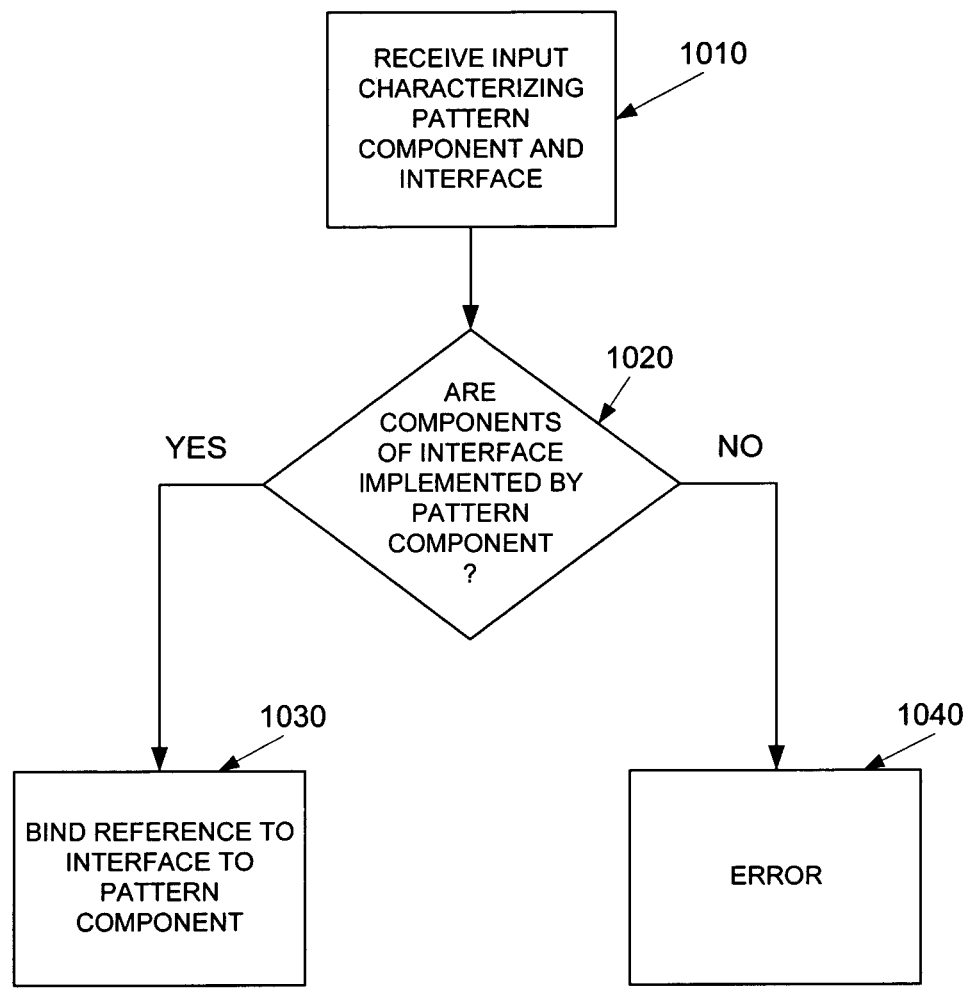
FIG. 10 is a flowchart illustrating a process of supporting interfaces.

FIG. 10 is a flowchart illustrating a process of supporting interfaces. In general, a pattern component may implement an interface. If the interface is implemented, an instance of the interface may act as a reference to the pattern component (e.g., via a binding of an implementation of the components of the interface to the reference). For example, runtime objects comprising the pattern component and implementations of the interface components may be generated and references to those components in source code may be treated as references to those implementations. If a pattern component does not implement an interface, an error may be raised.

Input characterizing a pattern component and an interface may be received (1010). The input may include source code defining a pattern component, indicating that the interface is implemented by the pattern component, and defining the interface. The interface may include one or more methods that are to be implemented by any pattern component implementing the interface.

A determination is made as to whether the components of the interface are implemented by the pattern component (1020). For example, the interface may include several methods and the determination may include determining whether those methods are implemented by source code of the pattern component (e.g., having same names, same arguments, and the like).

If the components of the interface are implemented by the pattern component, a reference to the interface is bound to the pattern component (1030); otherwise, an error may be raised (1040). Binding the reference to the interface to the pattern component may include, compiling source code referencing the interface with the source code implementing the interface (e.g., compiling the implementations of the pattern component in lieu of the references to the interface). An error may notify a user that an interface was not implemented.

Figure 11:
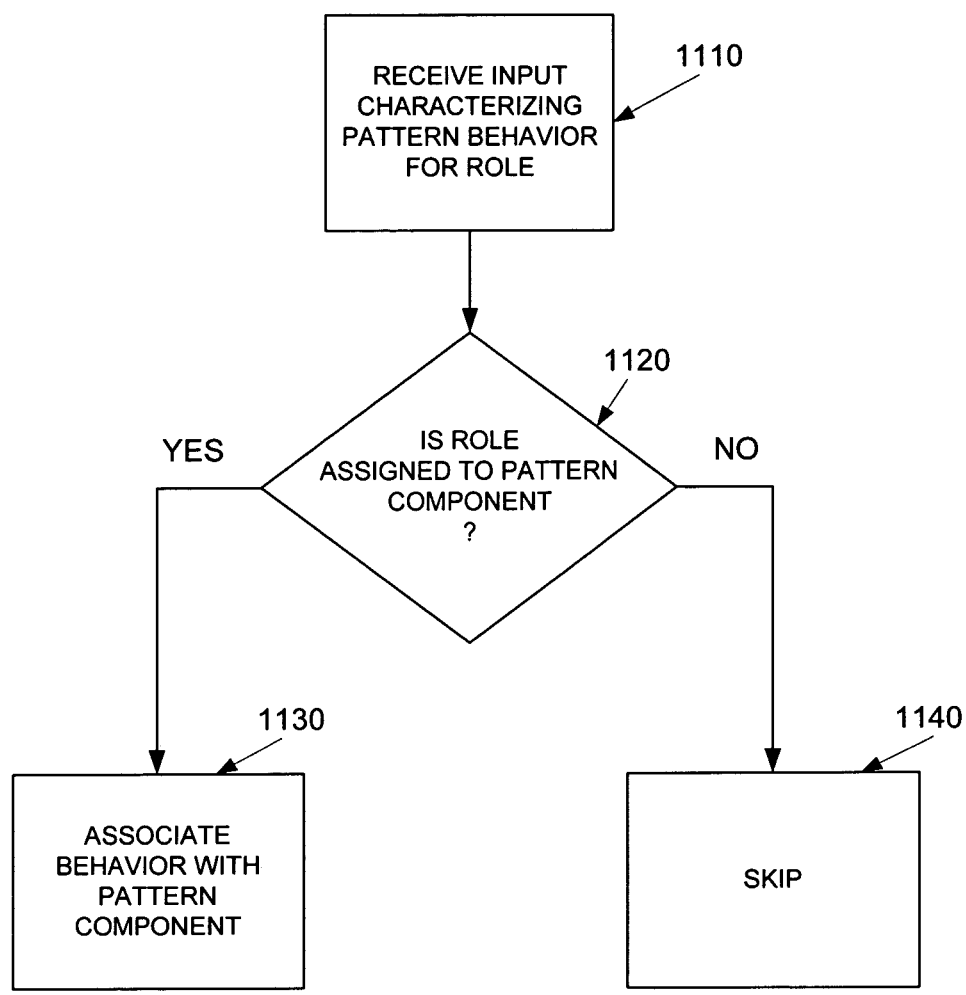
FIG. 11 is a flowchart illustrating a process of supporting roles.

FIG. 11 is a flowchart illustrating a process of supporting roles. In general, the process involves associating a behavior with a pattern component depending on a role of a pattern component. Input is received that characterizes pattern behavior for a role (1110). The input may include source code of a pattern component that characterizes behavior for that role that depends on an assigned role of that pattern component or another pattern component. For example, the input may include source code of a pattern component that indicates an operation is to be performed if an assigned role of a child component is a particular role.

A determination is made as to whether the role is assigned to a pattern component (1120). For example, a determination may be made as to whether a pattern component is assigned a role that is associated with the behavior of 1110. For example, an "if" conditional statement may indicate that if a child component has a role "detachable," a behavior allowing the component to be detached may be performed. Then, a check may be made of a property "assignedRole" to determine if a child component has the role "detachable."

A combination of different types of support may be used to assign a role to a pattern component and a pattern component may be assigned any number of roles (e.g., zero, one, or multiple roles). For example, one type of support may include receiving a selection of a role in an end-user application development environment in a dialogue box that allows for an assigned roles property to be set. As another example, when compiling a pattern component, an interface implemented by a pattern component may be used to determine a role to assign. For example, if a pattern component is a child component of another component, the child component's interface may be used to determine a role that may be assigned based on a listing of interfaces and associated roles to assign in the parent component (e.g., as described above in example pseudo-code).

If a role is assigned to a pattern component, the behavior may be associated with the pattern component (1130); otherwise, it might not be associated with the pattern component (1140). For example, a behavior may be associated with a pattern component by including code corresponding to the behavior in a runtime version of the pattern (e.g., in a late-binding of code to pattern components) to be included in an application. Not associating the behavior may include doing nothing (e.g., such that code corresponding to the behavior is not included in a runtime version of the pattern component), setting a property to indicate the behavior is not to be performed, and the like.

In variations, additional, different, or fewer operations can be performed in the processes of FIGS. 10 and 11. For example, in the process of FIG. 10, a pattern component may implement multiple interfaces and determinations may be made as to whether all the interfaces are implemented.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other in a logical sense and typically interact through a communication network. The relationship of client and server arises by virtue of computer programs running on the respective computers and having a client-server relationship to each other.

The subject matter described herein has been described in terms of particular embodiments, but other embodiments can be implemented and are within the scope of the following claims. For example, operations can differ and still achieve desirable results. In certain implementations, multitasking and parallel processing may be preferable. Other embodiments are within the scope of the following claims.

What is claimed is:

1. A computer program product, tangibly embodied in a machine-readable storage device, the computer program product being operable to cause data processing apparatus to perform operations comprising:

receiving input characterizing:
a definition of potential roles for a plurality of child components of a pattern component, the plurality of child components and the pattern component forming a hierarchical structure, the pattern component being an object identification pattern component that is displayed on a graphical user interface of a resource planning application, the pattern component containing the plurality of child components displayed on the graphical user interface, the plurality of child components comprising a data view component, a form pane component, a list pane component, and a chart pane component, each child component containing a plurality of grandchild components displayed on the graphical user interface, the plurality of grandchild components comprising one or more tool bars, one or more tables, and one or more tab strips, each potential role associated with one or more interfaces, the pattern component defining a pattern of a component of an application in a visual modeling environment of an application development system, and
a selection, based on user interaction and from the plurality of child components, of a child component of the plurality of child components that implements at least one of the one or more interfaces;

determining, based on a role associated with the pattern component, a role associated with an interface implemented by the child component, the role being one of the potential roles;

assigning the role associated with the interface to the child component; and associating, based on the role of the child component, a corresponding behavior with the each child component of the plurality of child components such that the corresponding behaviors of the child components differ based on the role of the corresponding child component of the plurality of child components, the differing behavior of the child component being enabled by late-binding of the child component, wherein the pattern component graphically depicts an entity of a visual modeling language, and wherein the late-binding enables the extensibility of pattern components, the extensibility comprising addition of new one or more patterns such that existing one or more patterns adapt to the new one or more patterns without a change of the existing one or more patterns.

2. A computer program product in accordance with claim 1, wherein the pattern component is a configurable, reusable unit corresponding to a task, the pattern component having a specific semantic meaning and defined interaction behavior.

3. A computer program product in accordance with claim 1, wherein an architecture of the visual modeling environment of a visual modeling program comprises:

a first layer defining a technical platform on which the application executes, a second layer defining a framework for implementing a modeling language in the technical platform, the second layer providing a framework for defining components of the application in a graphical manner, the second layer providing tools and services to enable the execution of the application on the technical platform, a third layer defining design-time interfaces for modeling language entities, at least one design-time interface of the design-time interfaces comprising the pattern of the component of the application, and a fourth layer defining a layer for configuring the modeling language entities, wherein pattern components are implemented in the third layer and the role is assigned in the fourth layer.

4. A computer program product in accordance with claim 1, the operations further comprising: associating a behavior with the child component, the behavior associated with the role.

5. A computer program product in accordance with claim 4, wherein the associating the behavior comprises generating a runtime version of the child component including the associated behavior.

6. A computer program product in accordance with claim 1, the operations further comprising: associating a behavior with the pattern component, the behavior associated with the role of the child component.

7. A computer program product in accordance with claim 1, the operations further comprising:

determining that a second potential role is not associated with the child component; and omitting behaviors associated with the second potential role from a runtime version of the child component.

8. A computer program product in accordance with claim 1, wherein the assigning comprises:

assigning the role associated with the interface to the child component if a cardinality associated with the role allows the child component to be a child of the pattern component; otherwise, prohibiting the child component from being a child of the pattern component in a runtime version of an application.

9. A computer program product in accordance with claim 1, the operations further comprising:

receiving input characterizing:
a selection of a second child component implementing at least one of the one or more interfaces;

determining a second role associated with a second interface implemented by the second child component, the second role being one of the potential roles; and assigning the second role associated with the second interface to the second child component.

10. A computer program product in accordance with claim 1, the operations further comprising:

receiving input characterizing:
a definition of second potential roles for child components of a second pattern component, each potential role associated with second one or more interfaces, and
a selection of a second child component implementing the interfaces of the child component of the pattern component;

determining a second role associated with one of the interfaces implemented by the second child component, the second role being one of the second potential roles; and assigning the second role associated with the interfaces to the second child component, the second role being distinct from the role of the child component based on the potential roles of the pattern component being different from the second potential roles of the second pattern component.

11. A computer program product, tangibly embodied in a machine-readable storage device, the computer program product being operable to cause data processing apparatus to perform operations comprising:

assigning a role to a pattern component of a visual modeling environment of an application development system, the pattern component and a plurality of associated child components forming a hierarchy associated with a hierarchical structure of a model of an application in a visual modeling environment of an application, the pattern component being an object identification pattern component that is displayed on a graphical user interface of a resource planning application and including the plurality of associated child components, the plurality of child components comprising a data view component, a form pane component, a list pane component, and a chart pane component, each child component containing a plurality of grandchild components displayed on the graphical user interface, the plurality of grandchild components comprising one or more tool bars, one or more tables, and one or more tab strips; and associating, based on the role assigned to the pattern component, a corresponding behavior with each pattern component such that the corresponding behavior of the pattern component differs based on the role of the corresponding pattern component, the differing behavior of the pattern component being enabled by late-binding of the pattern component, and wherein the late binding comprises performing, at run time, the corresponding behavior, wherein the pattern component graphically depicts an entity of a visual modeling language, and wherein the late-binding enables the extensibility of the pattern component and the associated child components, the extensibility comprising addition of new one or more patterns such that existing one or more patterns adapt to the new one or more patterns without a change of the existing one or more patterns.

12. A computer program product in accordance with claim 11, wherein the assigning a role comprises:

determining the role associated with an interface implemented by the pattern component.

13. A computer program product in accordance with claim 12, wherein the assigning a role further comprises:

determining the role associated with the interface based on an association in a context of the component.

14. A computer program product, tangibly embodied in a machine-readable storage device, the computer program product being operable to cause data processing apparatus to perform operations comprising:

receiving input characterizing a definition of a pattern component and an interface implemented by the pattern component, the pattern component being a pattern of a component for application development in a visual modeling environment;

determining whether components of the interface are implemented by the pattern component; and if components of the interface are implemented by the pattern component, binding a reference to the interface to the pattern component; and associating, based on the role of the pattern component, a corresponding behavior with the each child component of a plurality of child components of the pattern component such that the corresponding behaviors of the plurality of child components differ based on the role of the corresponding pattern component, the plurality of child components and the pattern component forming a hierarchical structure such that the pattern component is a parent component of the plurality of child components, the parent component comprising the plurality of child components, the differing behavior of the pattern component being enabled by late-binding of the pattern component, wherein the pattern component graphically depicts an entity of a visual modeling language, wherein the pattern component and the plurality of child components are graphically represented in a graphical user interface of a resource planning application, the pattern component comprising an object identification pattern component, the plurality of associated child components comprising a data view component, a form pane component, a list pane component, and a chart pane component, each child component containing a plurality of grandchild components comprising one or more tool bars, one or more tables, and one or more tab strips.

15. A computer program product in accordance with claim 14, wherein the binding comprises generating a runtime version of the pattern component in lieu of the reference to the interface.

16. A computer program product in accordance with claim 14, the operations further comprising:

assigning a role to the pattern component based on a type of the interface.

* * * * *